United States Patent [19]

Johansson et al.

[11] 4,171,797
[45] Oct. 23, 1979

[54] WINCH ARRANGEMENT

[76] Inventors: Bengt D. Johansson, Vastergatan 22, Smälandsstenar, Sweden, S-330 23; Bo Å. L. Blixt, Djurgärdsgatan 34, Göteborg, Sweden, S-414 62

[21] Appl. No.: 840,471

[22] Filed: Oct. 7, 1977

[51] Int. Cl.² ............................................. B66D 1/06
[52] U.S. Cl. ............................ 254/186 HC; 254/162
[58] Field of Search ........ 254/162, 163, 164, 186 HC, 254/149, 51, 167, 135 R, 186 R; 280/179 A, 179 R; 105/368 T, 473, 466, 469

[56] References Cited

U.S. PATENT DOCUMENTS

| 384,929 | 6/1888 | Pugh | 254/163 |
|---|---|---|---|
| 830,797 | 9/1906 | Miller | 254/162 |
| 880,552 | 3/1908 | Lundin | 254/162 |
| 1,477,529 | 12/1923 | Allbin | 254/186 HC |
| 1,502,389 | 7/1924 | Lovatt | 254/162 X |
| 3,428,331 | 2/1969 | Morgan et al. | 254/163 UX |
| 3,804,368 | 4/1974 | Bailey | 254/164 X |

Primary Examiner—Robert J. Spar
Assistant Examiner—Jerold M. Forsberg
Attorney, Agent, or Firm—Beveridge, DeGrandi, Kline & Lunsford

[57] ABSTRACT

Winch arrangement primarily intended for withdrawal of hung trees or other objects, comprising a holding unit for fixing the winch to a stationary object, and a winch unit connected to a frame. The holding unit includes an elongated fastening means which at one end is secured to the frame, while its intermediate portion is drawn around the stationary object and its other end is connected to the frame via a tightening mechanism. The winch unit comprises a drum rotatably mounted on a shaft in the frame for unwinding and winding a flat band which at its free end has a fastener for connection to the tree, a control mechanism for the operation of the drum, and an engageable and disengageable ratchet mechanism for selectively preventing unwinding of the band.

6 Claims, 6 Drawing Figures

WINCH ARRANGEMENT

The present invention relates to a winch arrangement primarily intended for withdrawal of hung trees or other objects, in which the winch comprises a holding unit for fixing the winch to a stationary object, and a winch unit connected to a frame.

In conventional winches for withdrawal of hung trees, the hauling means used are chains or ropes of heavy and bulky construction, and the winches will therefore be difficult to handle and will require a considerable amount of tractive power for their operation. In case the tree is tightly stuck, the direct power transmission to the drum, on which the hauling means is to be wound, is often found insufficient and some form of increase gear is required to obtain a higher gear ratio to disengage the tree from its locked position. As logging mostly takes place on rough ground the winch should preferably be easily portable and easily operable.

The object of the invention is to provide a winch arrangement which eliminates the problem outlined above and is of simple and inexpensive construction and easily mounted.

This object is achieved by the winch arrangement of this invention, wherein the holding unit includes an elongated fastening means which has one end secured to the frame, while its intermediate portion is drawn around the stationary object and its other end is connected to the frame via a tightening mechanism, and wherein the winch unit comprises: a drum rotatably mounted on a shaft in the frame for unwinding and winding a flat band which at its free end has a fastener for connection to the tree; a control mechanism for the operation of the drum; and an engageable and disengageable ratchet mechanism for selectively preventing unwinding of the band.

The invention will be described in greater detail hereinafter with reference to the accompanying drawings, which illustrate a preferred embodiment and in which.

Figure 1:
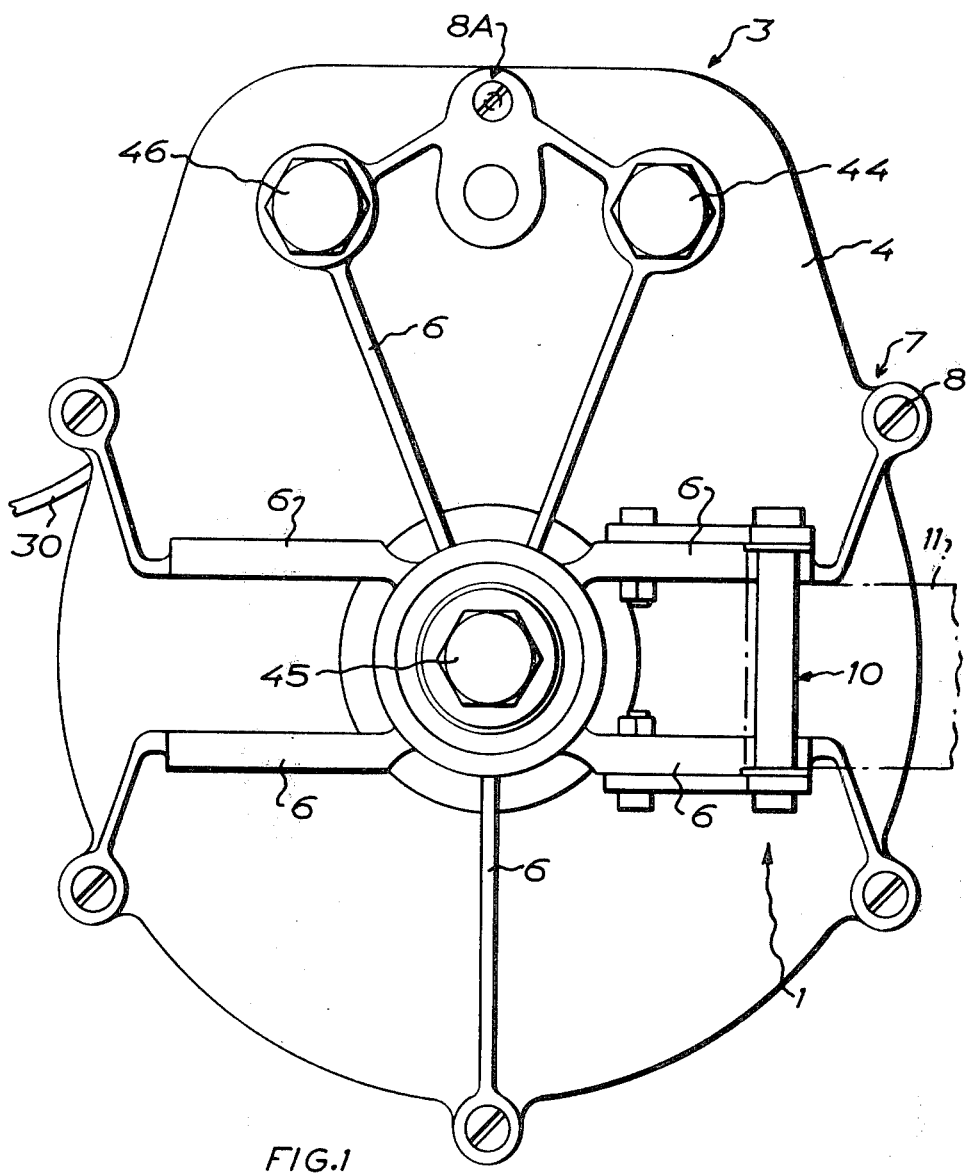
FIG. 1 is a first side view of a winch according to the invention, showing a half of a winch casing and part of the holding unit included in the winch.
Figure 2:
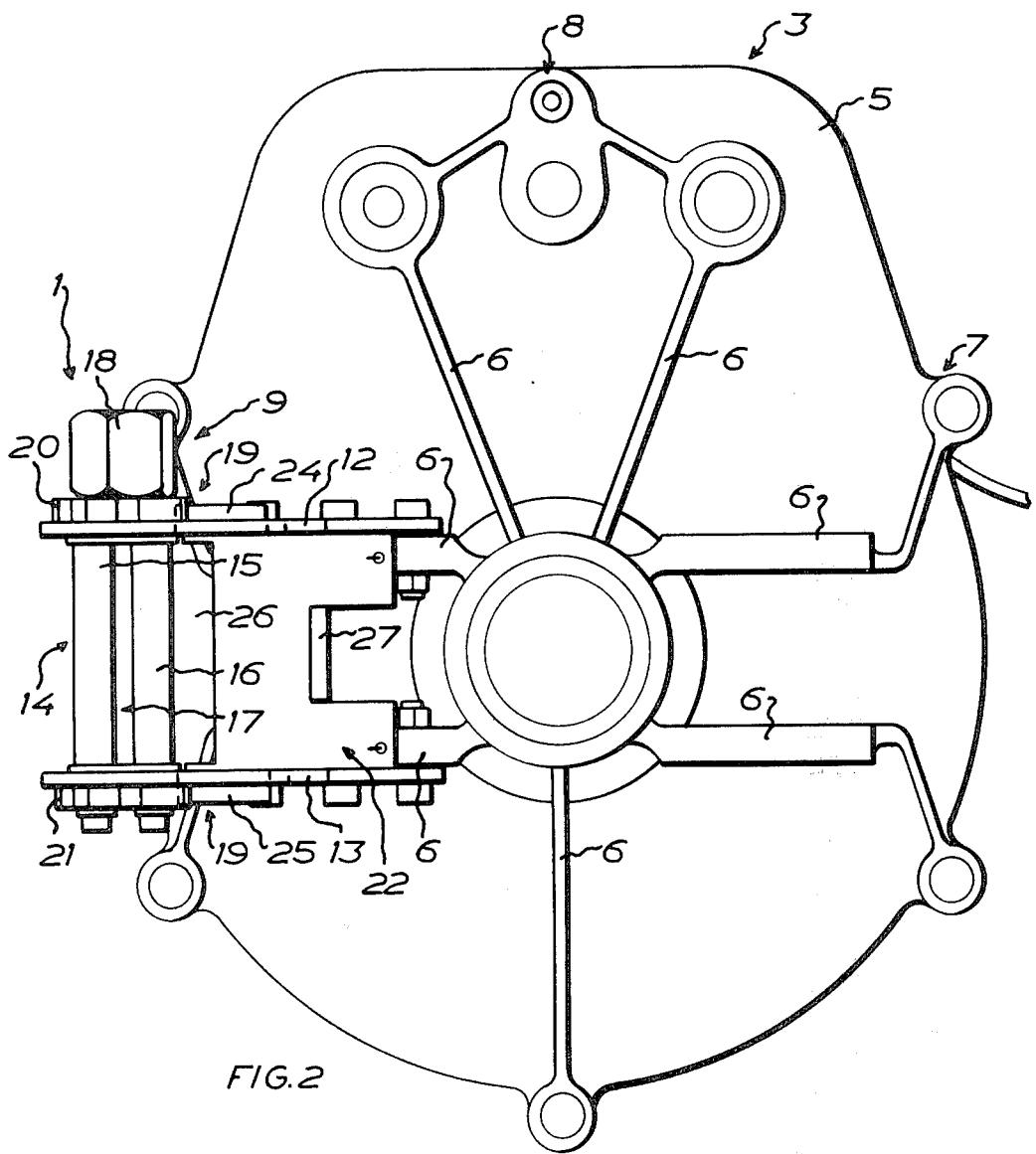
FIG. 2 is a second side view of the winch, showing the other half of the winch casing and the remaining part of the holding unit.
Figure 3:
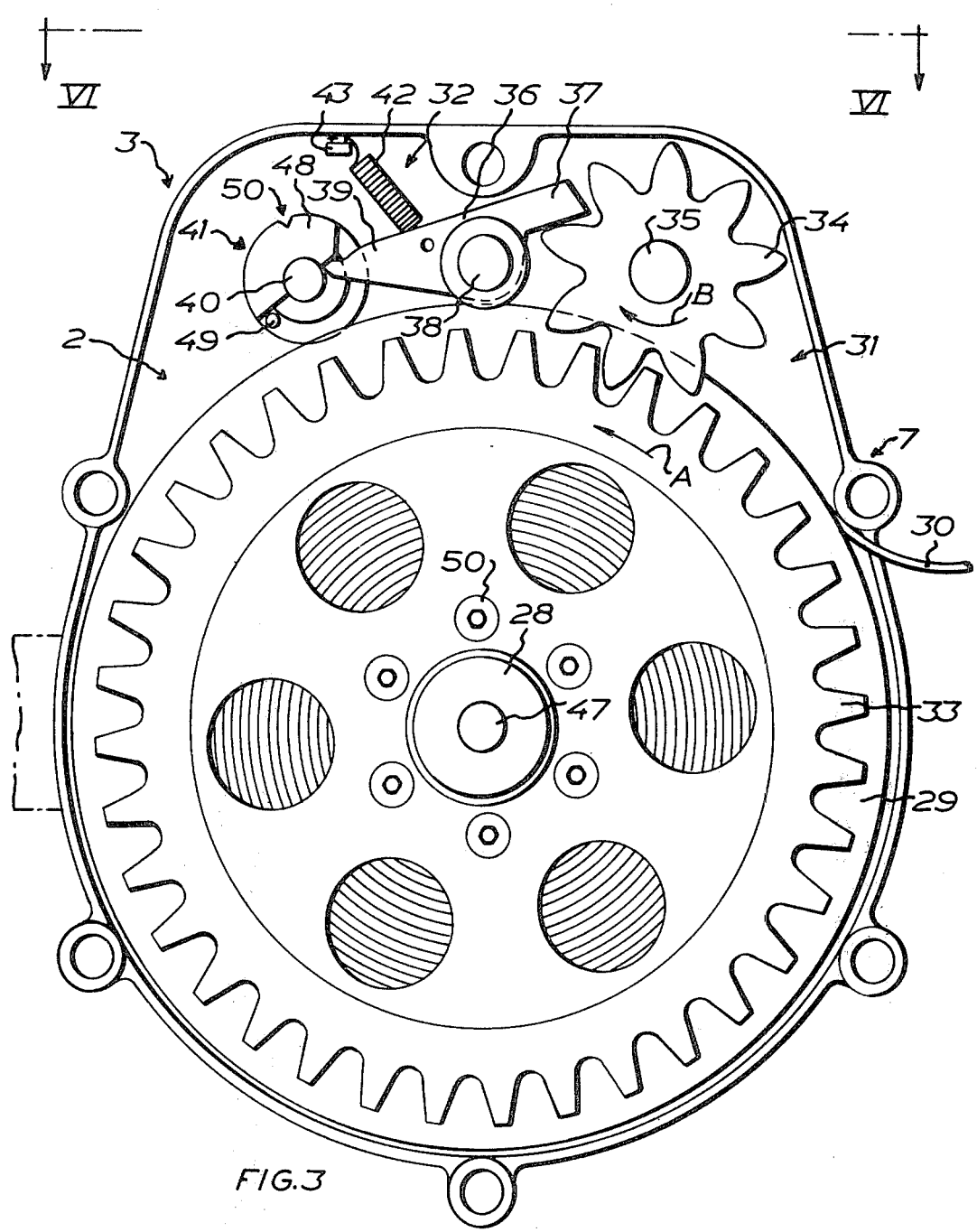
FIG. 3 is a side view of the winch, in which said other half of the casing is removed, thus uncovering the winch unit included in the winch.

FIGS. 1, 2 and 3 show a winch arrangement primarily intended for withdrawal of hung trees. This arrangement comprises two main parts, viz. a holding means 1 for fixing the winch to a stationary object, and a winch unit 2, said units being connected to a frame 3. In this case the frame comprises two protecting halves 4, 5 of a casing, which are reinforced by means of strengthening springs 6. The halves 4, 5 of the casing are provided with apertured lugs 7 adapted to receive fixing bolts 8 for securing the halves of the casing to each other. Another bolt 8A is provided for the same purpose.

Figure 5:
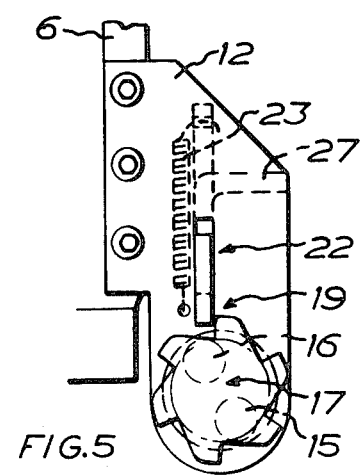
FIG. 5 is a side view of the part of the holding means shown in FIG. 2.

As shown in FIGS. 1, 2 and 5 the holding unit 1 comprises a tightening mechanism 9 mounted on the half 5 of the casing, a support 10 mounted on the half 4 of the casing, and an elongated fastening means 11, preferably consisting of a flat band of nylon represented by dash-dotted lines in FIG. 1. Said fastening means has one end pivotally connected to the support 10, while its intermediate portion is drawn around the stationary object, e.g. the trunk of a standing tree, and its other end is connected to the half 5 of the casing via the tightening mechanism 9. The tightening mechanism 9 includes a frame structure comprising two plates 12, 13 which are spaced from each other and connected each to one of the strengthening springs 6 of the half 5 of the casing. Rotatably mounted between the plates 12, 13 is a shaft 14 comprising two parallel pins 15, 16 positioned between the plates and spaced from each other so that a slot 17 is formed therebetween for receiving the free end of the band 11. A suitable tool is used to rotate the bolt head 18 of the shaft 14 whereby the band 11 is wound on the shaft 14 and is tightened so that the winch will be fixed to the stationary object. A blocking means 19 is arranged on the tightening mechanism 9 to prevent unwinding of the fastening means. The blocking means acts upon both ends of the shaft to load this uniformly. The blocking means comprises: two tooth wheels 20, 21 positioned each on one of the ends of the shaft 14; a locking plate 22 which engages the two tooth wheels simultaneously and is slidably received in grooves in the plates 12, 13 of the frame structure and two springs 23 which bias the locking plate 22 towards a locked position. By "locked position" is to be understood the position in which the band is locked against unwinding. The locking plate 22 comprises a generally rectangular disk having two projections 24, 25 arranged in the front part of the locking plate and running in said grooves in the plates 12 and 13, said projections engaging each one of the tooth wheels 20 and 21, respectively. The projections define between themselves a recess 26 for receiving the band 11 between the plate 22 and the shaft 14. At its rear end the locking plate has an upwardly bent member 27 for manually releasing the tightening mechanism 9.

Figure 4:
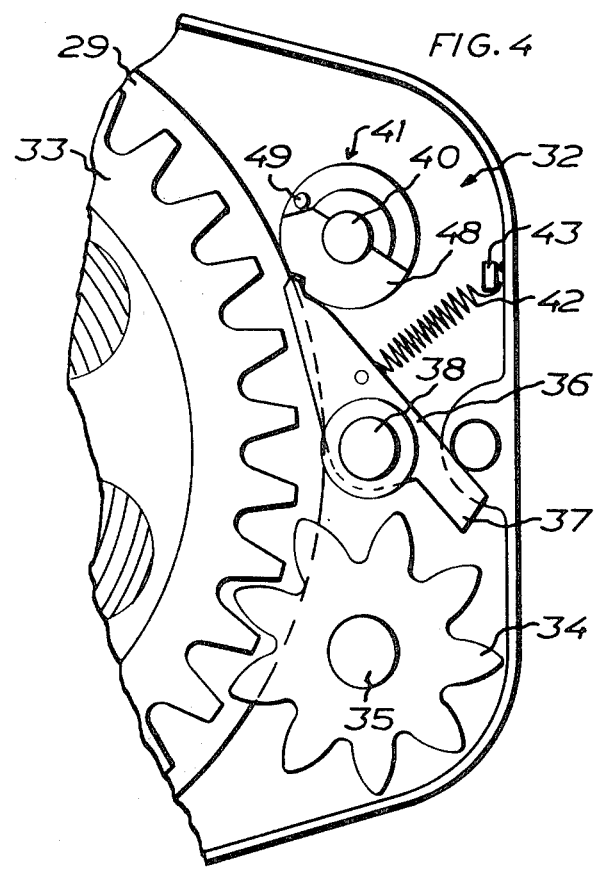
FIG. 4 shows part of the view of FIG. 3, with the winch unit in a different position of function.
Figure 6:
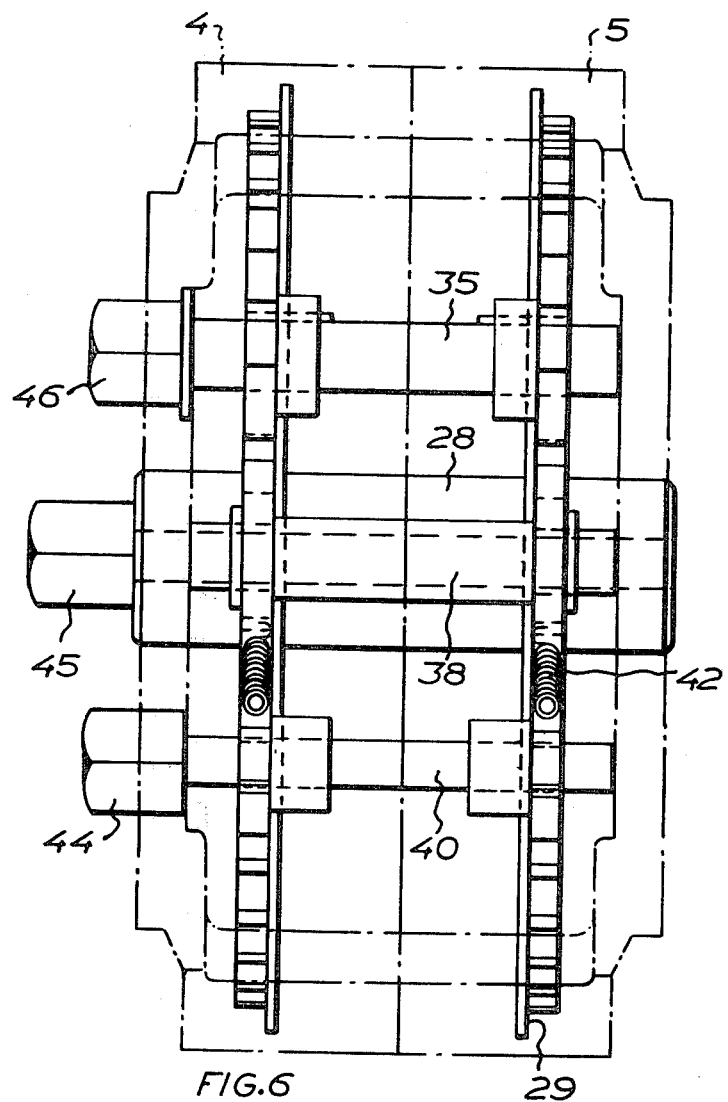
FIG. 6 is an end view taken on line VI—VI in FIG. 3, showing the winch unit in greater detail, the winch casing being represented by dash-dotted lines.

The winch unit 2 comprises, as is best shown in FIGS. 3, 4 and 6: a drum 29 rotatably arranged on a shaft 28 in the frame 3 for unwinding and winding a flat winch band 30 of nylon having at its free end a fastener for connection to the hung tree; a control mechanism 31 for driving the drum 29; and an engageable and disengageable ratchet mechanism 32 for selectively preventing unwinding of the winch band 30.

The control mechanism 31 is a transmission including two gear wheels 33, 34 of different size, the larger gear wheel 33 of which is connected coaxially with the drum 29 and the smaller gear wheel 34 is rotatably mounted on a shaft 35 arranged in the frame 3 and engages the large gear wheel 33 to apply an increased force on the winch band 30. The ratchet mechanism 32 includes an elongated pawl 36 a first end 37 of which selectively engages the small gear wheel 34, while its intermediate portion is pivotally mounted on a shaft 38 in the frame 3, and its other end 39 is operable by a cam member 41 which is arranged on a rotary shaft 40 in the frame 3, said pawl 36 being biased by means of a spring 42, one end of which is connected to the frame 3 by means of a fastening screw 43 and the other end of which is secured in a hole in the pawl, towards a position (see FIG. 3) where the pawl 36 engages the small gear wheel 34.

In FIG. 3 the ratchet mechanism 32 is shown in the position taken when the winch is working, i.e. when the winch band 30 is being retracted. FIG. 4 shows, on the contrary, the position in which the winch band is to be unwound from the drum in order to be connected to the hung tree. These two positions (FIGS. 3 and 4, respectively) may be taken selectively by adjusting the cam member 41 by means of a nut 44. To wind the winch band 30 on the drum 29 the gear wheels 33 and 34 are brought to rotate in the direction of the arrows A and B, respectively. This rotation is brought about by turning nuts 45 and 46, respectively, by means of a suitable tool, e.g. a self-tightening wrench of per se known type. The nut 45 is connected with a shaft 47 which is screwed tight into the shaft 28 of the drum 29 and retains the inner end of the winch band 30. The cam member 41 comprises a rotatable member 48 of generally semicylindrical shape. A fixed projection 49 delimits the rotation of the cam member, the end positions of the rotation corresponding to the two different positions of the cam member. When the ratchet mechanism 32 takes the open position (FIG. 4) a projection at the other end 39 of the pawl engages a recess 50 in the cam member.

As appears from FIG. 6 the drum 29 has on either side a set of control and ratchet mechanisms 31 and 32, respectively, in order to obtain a uniform load on the shaft 28 of the drum, these two sets being arranged in reversed relationship, the shafts 28, 35, 38, 40 of one set being identical with the shafts of the other set.

What we claim and desire to secure by Letters Patent is:

1. A winch arrangement primarily intended for withdrawal of hung trees or other objects, comprising,
    a frame, a winch unit connected to the frame and a holding unit for fixing the frame to a stationary object,
    said holding unit including a flat band elongated fastening means which has one end secured to the frame and an intermediate portion which is drawn around a stationary object, a tightening mechanism supported on the frame and connected to the other end of the elongated fastening means to fix the frame to the stationary object, said tightening mechanism including a first shaft rotatably mounted on the frame and having a longitudinally extending slot for receiving one end of the elongated fastening means, and a blocking means for preventing rotation of the first shaft and unwinding of the elongated fastening means, said blocking means including tooth wheels at opposite ends of the first shaft, and manually disengageable, resiliently engageable locking means for simultaneously locking both tooth wheels,
    a flat band provided with a fastener at its free end for connection to a tree, said winch unit including a drum rotatably mounted on a second shaft in the frame, said drum being connected to said flat band for unwinding and winding said flat band;
    two control mechanisms for operation of the drum, and two engageable and disengageable ratchet mechanisms for selectively preventing unwinding of the band from the drum, a control and a ratchet mechanism being located on each side of the drum to obtain a uniform load on the second shaft, each of said control and ratchet mechanisms having identical shafts and being in reversed relationship to the opposite control and ratchet mechanisms,
    each control mechanism including a transmission which has two gear wheels of different size, the larger gear wheel in each mechanism being connected coaxially with the drum and the smaller gear in each mechanism wheel being rotatably mounted on the frame and engaged with its associated said larger gear wheel to apply an increased force on the band,
    each ratchet mechanism including an elongated pawl having a first end selectively engageable with the smaller gear wheel, an intermediate portion pivotally mounted on the frame and another end, a rotary cam member mounted on the frame and operable on said another end of the pawl, a spring biasing the pawl toward a position where the pawl engages the small gear wheel.

2. A winch assembly for removing objects such as hung trees, comprising
    a casing;
    a winch unit located inside the casing;
    a first band connected to and windable by the winch unit, said first band having a free end connectable to the object to be removed, said winch including a drum mounted on a shaft and a control mechanism for operating said drum, a disengageable ratchet mechanism for selectively preventing unwinding of the first band, said ratchet mechanism including an elongated pawl having a first end selectively engageable with the control mechanism;
    a second elongated band for attaching the casing to a stationary object, said second band having opposite ends connected to the casing and a midportion drawable around the stationary object; and
    a tightening mechanism for shortening the effective length of the second band, said tightening mechanism comprising a frame structure secured to the casing, a winding shaft rotatably mounted on the frame structure and blocking means for preventing reverse movement of the shaft and unwinding of the second band, the shaft having a longitudinal slot for receiving one end of the second band, said longitudinal slot extending entirely through said shaft to enable a double thickness of the second band to be wound on the shaft when the shaft is turned to fix the casing to the stationary object.

3. A winch arrangement according to claim 2 wherein said blocking means includes toothed wheels at opposite ends of the tightening mechanism shaft, and a manually disengageable, resiliently engageable locking means for simultaneously locking both toothed wheels.

4. A winch arrangement according to claim 2 wherein said control mechanism includes a transmission which has two gear wheels of different size, the larger gear wheel being connected coaxially with the drum and the smaller gear wheel being rotatably mounted on a shaft arranged in the casing and engaged with the larger gear wheel to apply an increased force on the band, said ratchet mechanism being engageable with said smaller wheel.

5. A winch arrangement according to claim 4 wherein said apparatus including two said control mechanisms and two said ratchet mechanisms, with one control mechanism and one ratchet mechanism being arranged on each side of the drum to obtain a uniform load on the drum shaft, said control and ratchet mechanisms on each side of the drum having identical shafts and being in reversed relationship with respect to the opposite control and ratchet mechanisms.

6. A winch arrangement according to claim 4 wherein the ratchet mechanism has a pivoted intermediate portion and an opposite end portion,
   a cam member rotatable with respect to the frame and engageable with the opposite end portion of the elongated pawl, a spring biasing the pawl toward a position where the pawl engages the small gear wheel.

* * * * *